(12) United States Patent
Fahimi et al.

(10) Patent No.: US 9,306,828 B2
(45) Date of Patent: Apr. 5, 2016

(54) METHOD OF, AND APPARATUS FOR, ADAPTIVE SAMPLING

(71) Applicant: Xyratex Technology Limited, Hampshire (GB)

(72) Inventors: Farshad Fahimi, Havant (GB); Roger Pimlott, Havant (GB)

(73) Assignee: XYRATEX TECHNOLOGY LIMITED-A SEAGATE COMPANY, Havant (GB)

( * ) Notice: Subject to any disclaimer, the term of this patent is extended or adjusted under 35 U.S.C. 154(b) by 251 days.

(21) Appl. No.: 13/941,220

(22) Filed: Jul. 12, 2013

(65) Prior Publication Data
US 2015/0019917 A1    Jan. 15, 2015

(51) Int. Cl.
*G06F 11/00* (2006.01)
*H04L 12/26* (2006.01)
*G06F 11/30* (2006.01)
(Continued)

(52) U.S. Cl.
CPC .......... *H04L 43/103* (2013.01); *G06F 11/0727* (2013.01); *G06F 11/0766* (2013.01); *G06F 11/30* (2013.01); *G06F 11/3034* (2013.01); *G06F 11/3058* (2013.01); *G06F 11/3089* (2013.01); *G06N 7/005* (2013.01); *H04L 41/0695* (2013.01); *H04L 41/142* (2013.01); *H04L 43/04* (2013.01); *H04L 43/0817* (2013.01)

(58) Field of Classification Search
CPC ............ G06F 11/0727; G06F 11/0766; G06F 11/3003; G06F 11/3006; G06F 11/3034; G06F 11/3055; G06F 11/3058; G06F 11/3089; G06F 11/3096; G06F 11/30; G06N 7/005; H04L 41/0695; H04L 41/142; H04L 43/103; H04L 43/04; H04L 43/0817
See application file for complete search history.

(56) References Cited

U.S. PATENT DOCUMENTS 4,755,795 A   7/1988   Page
5,977,957 A   11/1999  Miller et al.
(Continued)

FOREIGN PATENT DOCUMENTS

WO   00/69042   11/2000

OTHER PUBLICATIONS

Philippe Bourquin, "Adaptive Sampling for Sensor Networks," ETH Swiss Federal Institute of Technology Zurich, pp. 1-10 (2005).
(Continued)

*Primary Examiner* — Bryce Bonzo
*Assistant Examiner* — Anthony J Amoroso
(74) *Attorney, Agent, or Firm* — Hollingsworth Davis, LLC

(57) ABSTRACT

A method of sampling sensor data from a computing system is presented. The computing system includes a plurality of components and a sensor network for monitoring the computing system. The sensor network includes primary sensor nodes operable to obtain primary parameter data from a measurement of a primary parameter of the components, and secondary sensor nodes operable to obtain secondary parameter data from a measurement of secondary parameters of the components. The method includes: a) obtaining secondary parameter data from secondary sensor nodes relating to components; b) processing, in a computing device, the secondary parameter data; c) determining, based upon determined or pre-determined relationships between the secondary parameters and the primary parameter, a sample rate for the primary parameter data for the components; and d) obtaining primary parameter data from the primary sensor nodes relating to components at the determined sample rate.

23 Claims, 6 Drawing Sheets

(51) Int. Cl.
*G06F 11/07* (2006.01)
*G06N 7/00* (2006.01)
*H04L 12/24* (2006.01)

(56) References Cited

U.S. PATENT DOCUMENTS

| | | | |
|---|---|---|---|
| 6,950,895 B2 * | 9/2005 | Bottom | H05K 7/1445 361/796 |
| 8,017,411 B2 * | 9/2011 | Sonderman | H01L 22/20 438/14 |
| 2007/0074081 A1 | 3/2007 | DeWitt, Jr. et al. | |
| 2007/0079170 A1 * | 4/2007 | Zimmer | G06F 11/008 714/6.23 |
| 2012/0123610 A1 * | 5/2012 | Tupa | G06F 1/206 700/300 |
| 2013/0283102 A1 | 10/2013 | Krajec et al. | |

OTHER PUBLICATIONS

United Kingdom Combined Search and Examination Report dated Dec. 30, 2013 in corresponding Great Britain Patent Application No. GB1312550.0.

* cited by examiner

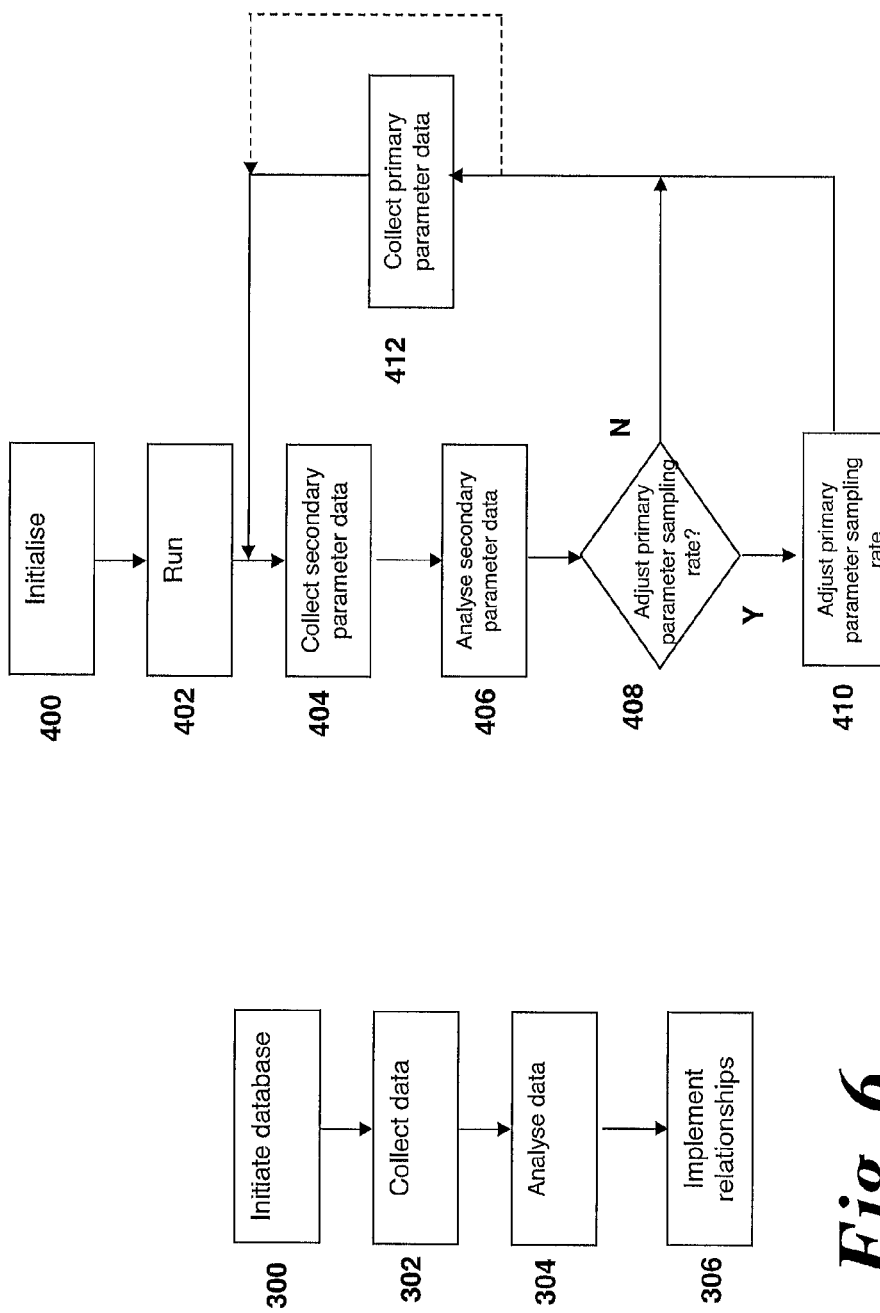

METHOD OF, AND APPARATUS FOR, ADAPTIVE SAMPLING

The present invention relates to a method of, and apparatus for, adaptive sampling on a storage system. More particularly, the present invention relates to a method of, and apparatus for, predicting primary operational parameters of a storage system using secondary operational parameters.

A typical storage system generally comprises a server and a plurality of hard disk drives connected together over a network to one or more servers, each of which provides a network-addressable storage resource. Alternatively, the storage system may comprise a local configuration where the storage resource is connected directly to a terminal or server or may form a local storage arrangement such as a hard disk drive in a laptop or personal computer.

RAID arrays are the primary storage architecture for large, networked computer storage systems. There are a number of different RAID architectures Commonly-used architectures comprise RAID-1 through to RAID-6. Each architecture offers disk fault-tolerance and offers different trade-offs in terms of features and performance. A RAID network is generally controlled by one or more RAID controllers which manage the physical storage of data on the drives forming part of the RAID array. RAID controllers provide data integrity through redundant data mechanisms, high speed through streamlined algorithms, and accessibility to stored data for clients and administrators. Should one of the disks in a RAID group fail or become corrupted, the missing data (usually in the form of blocks) can be recreated from the data on the other disks.

Certain storage systems are particularly optimised for access performance. Such systems are known as high performance computing (HPC) systems. These systems are often complex and are used for complex tasks such as and analysing complex physical or algorithmic data.

In general, HPC systems comprise a plurality of HPC clusters of one or more servers. These servers comprise one or more controllers and one or more arrays of storage devices (such as hard drives). The performance of HPC systems is generally a function of the number of servers and/or storage devices which are operable in parallel.

It is necessary to monitor properties of such systems in order to detect failures and errors in the system. In the context of HPC systems, such failures may be hardware errors such as hard drive corruptions and failures, or CPU errors due to, for example, overheating. Therefore, it is common to request such data from the hardware, this data then being stored in a monitored log. Hardware failure can then be logged and detected.

However, HPC systems are complex and may comprise a large number of components, e.g. CPUs, controllers and hard drives. Each component that is required to be monitored requires an appropriate sensor or some sensing capability. This may take the form of, inter alia, a hardware sensor such as a temperature or fan speed sensor, a sensing capability of the hardware (e.g. SMART (Self-Monitoring, Analysis and Reporting Technology) enabled hard drive diagnostic properties) or a software sensor such as a CPU usage monitor. Each sensor or sensor-capable element is operable to provide, at regular intervals (e.g. at a particular sampling rate) or on demand, a measurement at a particular time on the hardware/software quantity in question. This data may be stored in a log, either locally or remotely across, for example, a network.

Each sensor or sensor-capable element may be considered to be a sensor node. In a typical HPC system, there may be a large number of sensor nodes. Therefore, to report sensor data from all the sensor nodes requires the streaming and storage of a huge amount of data. This data is required to be stored over a long period of time. Storing, archiving and maintaining this data can be costly, and subsequent analysis of archived data can be computationally time-consuming and expensive.

Furthermore, obtaining sensory data can reduce the performance of HPC systems. For example, performing SMART diagnostics on a hard drive can reduce the instantaneous read/write speed of the drive in question. Since read/write access speed and data streaming performance is paramount for HPC systems, this additional load on the system is inconvenient and unwanted.

One approach to reduce the volume of data required is to reduce the sampling rate for the sensor nodes. However, in order to perform useful data analysis, a minimum sampling rate is required. This is often the case for monitoring algorithms which may use historical data to attempt to predict drive failure. Furthermore, if the sampling rate is too low, it may be possible to miss errors and problems altogether.

It is also known to provide a variable sampling rate for sensor nodes in different applications. This is known as adaptive sampling and examples of this technique can be found in: U.S. Pat. No. 5,977,957; U.S. Pat. No. 8,017,411; U.S. Pat. No. 4,755,795; WO-A-00/69042; and "Adaptive Sampling for Sensor Networks" ETH Swiss Federal Institute of Technology (2005). These examples typically use frequency-based algorithms.

However, whilst adaptive sampling may reduce the overall sensor data load on a system, it is still necessary to routinely sample data from the sensor nodes. This is because the selected frequency of sampling is entirely dependent upon the monitored parameter. This will still have a significant impact on the performance of an HPC system since sensor node monitoring and reports will still be necessary, albeit at reduced and variable intervals. Much of the data gathered will still be of little interest and will unnecessarily consume computing and storage resources.

Therefore, known approaches to sensor node sampling suffer from the technical problem that monitoring of sensor nodes is still required even in situations where such data is of little use. Therefore, there exists a need to provide a method and system which is able to obtain sensor data more pertinently and reduce data collection in situations where the data collection is unnecessary.

According to a first aspect of the present invention, there is provided a method of sampling sensor data from a computing system comprising a plurality of components and a sensor network for monitoring said computing system, said sensor network comprising one or more primary sensor nodes operable to obtain primary parameter data from a measurement of a primary parameter of one or more of said components, and one or more secondary sensor nodes operable to obtain secondary parameter data from a measurement of one or more secondary parameters of said one or more components, the method comprising: a) obtaining secondary parameter data from one or more secondary sensor nodes relating to one or more components; b) processing, in a computing device, said secondary parameter data; c) determining, based upon one or more determined or pre-determined relationships between said one or more secondary parameters and said primary parameter, a sample rate for said primary parameter data for said one or more components; and d) obtaining primary parameter data from said one or more primary sensor nodes relating to one or more components at said determined sample rate.

In one embodiment, one or more of said components comprise hard drives and said primary parameter comprises hard drive status.

In one embodiment, said primary parameter comprises SMART diagnostic data.

In one embodiment, the computing system comprises a midplane including a CPU and memory, one or more hard drives located within an enclosure and at least one network connection.

In one embodiment, one or more of said secondary parameters is selected from the group of: hard drive enclosure temperature; hard drive enclosure fan speed; CPU temperature; CPU loading; memory usage; network usage; localised vibration; and midplane temperature.

In one embodiment, the method further comprises, prior to step a), e) obtaining data relating to said primary and secondary parameters; and f) analysing said primary and secondary parameters to determine correlations therebetween; and g) constructing a database containing pre-determined relational parameters between said primary and secondary parameters.

In one embodiment, step f) includes Bayesian probability analysis.

According to a second aspect of the present invention, there is provided a sensor network operable to obtain sensor data from a computing system comprising a plurality of components, said sensor network comprising one or more primary sensor nodes operable to obtain primary parameter data from a measurement of a primary parameter of one or more of said components, and one or more secondary sensor nodes operable to obtain secondary parameter data from a measurement of one or more secondary parameters of said one or more components, the sensor network being operable to obtain secondary parameter data from one or more secondary sensor nodes relating to one or more components; to processing said secondary parameter data; to determine, based upon one or more determined or pre-determined relationships between said one or more secondary parameters and said primary parameter, a sample rate for said primary parameter data for said one or more components; and to obtain primary parameter data from said one or more primary sensor nodes relating to one or more components at said determined sample rate.

In one embodiment, one or more of said components comprise hard drives and said primary parameter comprises hard drive status.

In one embodiment, said primary parameter comprises SMART diagnostic data.

In one embodiment, the computing system comprises a midplane including a CPU and memory, one or more hard drives located within an enclosure and at least one network connection.

In one embodiment, one or more of said secondary parameters is selected from the group of:

hard drive enclosure temperature; hard drive enclosure fan speed; CPU temperature; CPU loading; memory usage; network usage; localised vibration; and midplane temperature.

In one embodiment, the sensor network is further operable to obtain data relating to said primary and secondary parameters; analyse said primary and secondary parameters to determine correlations therebetween; and construct a database containing pre-determined relational parameters between said primary and secondary parameters.

In one embodiment, said analysis includes Bayesian probability analysis.

According to a third aspect of the invention, there is provided at least one data storage resource and the sensor network of the second aspect.

According to a fourth aspect of the present invention, there is provided a computer program product executable by a programmable processing apparatus, comprising one or more software portions for performing the steps of the first and/or second aspects.

According to a fifth aspect of the present invention, there is provided a computer usable storage medium having a computer program product according to the fourth aspect stored thereon.

According to a sixth aspect of the present invention, there is provided a method of sampling sensor data from a computing system comprising a plurality of components and a sensor network for monitoring said computing system, said sensor network comprising one or more primary sensor nodes operable to obtain primary parameter data from a measurement of a primary parameter of one or more of said components, and one or more secondary sensor nodes operable to obtain secondary parameter data from a measurement of one or more secondary parameters of said one or more components, the method comprising: a) obtaining secondary parameter data from one or more secondary sensor nodes relating to one or more components; b) processing, in a computing device, said secondary parameter data; c) determining, based upon one or more determined or pre-determined relationships between said one or more secondary parameters and/or said primary parameter, a sample rate for the or each secondary parameter data for said one or more components; d) obtaining secondary parameter data at the or each sample rate; and e) utilising said secondary parameter data to infer indirectly properties of said primary parameter.

In one embodiment, the method further comprises: f) determining, based upon one or more determined or pre-determined relationships between said one or more secondary parameters and/or said primary parameter, a primary sample rate for the primary parameter data for said one or more components; and g) obtaining primary parameter data from said one or more primary sensor nodes relating to one or more components at said determined primary sample rate.

In one embodiment, one or more of said components comprise hard drives and said primary parameter comprises hard drive status.

In one embodiment, said primary parameter comprises SMART diagnostic data.

In one embodiment, the computing system comprises a midplane including a CPU and memory, one or more hard drives located within an enclosure and at least one network connection.

In one embodiment, one or more of said secondary parameters is selected from the group of: hard drive enclosure temperature; hard drive enclosure fan speed; CPU temperature; CPU loading; memory usage; network usage; localised vibration; and midplane temperature.

In one embodiment, the method further comprises, prior to step a), h) obtaining data relating to said primary and secondary parameters; and i) analysing said primary and secondary parameters to determine correlations therebetween; and j) constructing a database containing pre-determined relational parameters between said primary and secondary parameters.

In one embodiment, step i) includes Bayesian probability analysis.

Embodiments of the present invention will now be described in detail with reference to the accompanying drawings, in which.

FIG. 6 is a flowchart showing an embodiment of a method of operation of the present invention; and FIG. 7 is a schematic diagram showing an embodiment of a method of operation of the present invention; and Embodiments of the present invention provide a method of indirectly obtaining information relevant to a primary parameter of a storage system or other computing apparatus using pre-determined relationships between measurable secondary parameters of the system.

Figure 1:
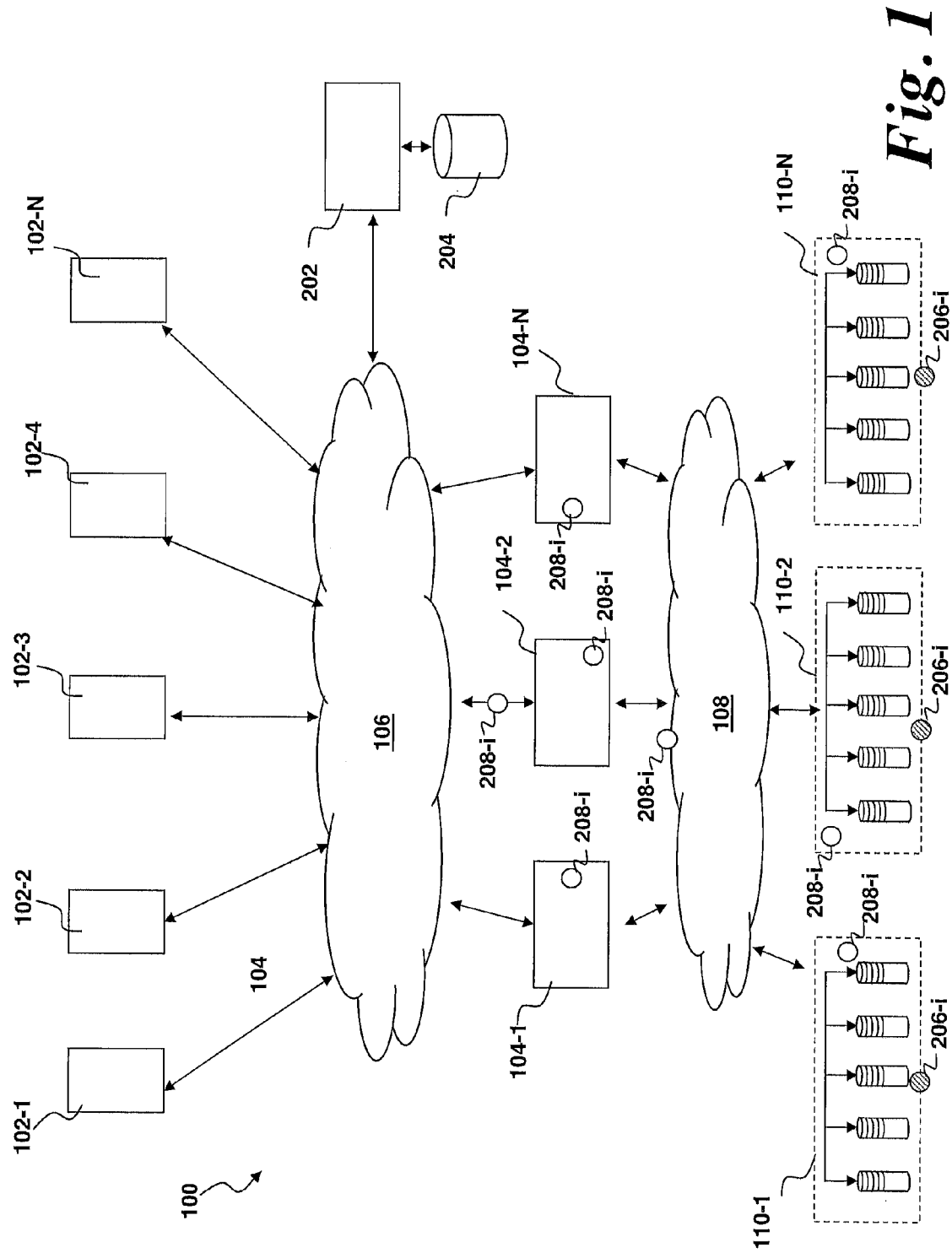
FIG. 1 is a schematic diagram of a networked storage system according to an embodiment of the present invention.

In general, measurement of a primary parameter has a performance impact on the system. However, the primary parameter is required to be measured in order to determine the status of the component of the system, directly. In contrast, the measurement of a secondary parameter has less, or no, impact on system performance. By establishing a database of hierarchical rules and relationships between secondary parameters and the or each primary parameter, the secondary parameters can be measured without substantial performance cost, until such a point where it is determined that the primary parameter should be measured. In other words, if the status of the one or more secondary properties indicates that a potential error or other condition may exist, the primary parameter can then be measured FIG. 1 shows a schematic illustration of a networked storage resource 100 in which the present invention may be used. However, it is to be appreciated that a networked storage resource is only one possible implementation of a storage resource which may be used with the present invention.

The networked storage resource 100 comprises a cluster file system. A cluster file system consists of client 102-1 to 102-N and server 104-1 to 104-N nodes, connected by a network 106. Client applications, running on client nodes, make storage requests (which may comprise file storage requests) against the cluster file system. Some of these calls result in updates to the file system state, recorded in volatile and persistent stores of node.

A commonly used distributed cluster file system is Lustre™. Lustre is a parallel distributed file system, generally used for large scale cluster computing. Lustre file systems are scalable and are able to support many thousands of clients and multiple servers.

The networked storage resource comprises a plurality of hosts 102. The hosts 102 are representative of any computer systems or terminals that are operable to communicate over a network. Any number of hosts 102 or servers 104 may be provided; N hosts 102 and N servers 104 are shown in FIG. 1, where N is an integer value.

The hosts 102 are connected to a first communication network 106 which couples the hosts 102 to a plurality of servers 104. The communication network 106 may take any suitable form, and may comprise any form of electronic network that uses a communication protocol; for example, a local network such as a LAN or Ethernet, or any other suitable network such as a mobile network or the internet.

The servers 104 are connected through device ports (not shown) to a second communication network 108, which is also connected to a plurality of storage devices 110-1 to 110-N. The second communication network 108 may comprise any suitable type of storage controller network which is able to connect the servers 104 to the storage devices 20. The second communication network 108 may take the form of, for example, a SCSI network, an iSCSI network or fibre channel.

The servers 104 may comprise any storage controller devices that process commands from the hosts 102 and, based on those commands, control the storage devices 110. The storage devices 110 may take any suitable form; for example, tape drives, disk drives, non-volatile memory, or solid state devices.

Although most RAID architectures use hard disk drives as the main storage devices, it will be clear to the person skilled in the art that the embodiments described herein apply to any type of suitable storage device. More than one drive may form a storage device 110; for example, a RAID array of drives may form a single storage device 110. The skilled person will be readily aware that the above features of the present embodiment could be implemented in a variety of suitable configurations and arrangements. Additionally, each storage device 110 comprising a RAID array of devices appears to the hosts 102 as a single logical storage unit (LSU) or drive. Any number of storage devices 110 may be provided; in FIG. 1, N storage devices 110 are shown, where N is any integer value.

The operation of the servers 104 may be set at the Application Programming Interface (API) level. Typically, Original Equipment Manufactures (OEMs) provide RAID networks to end clients for network storage. OEMs generally customise a RAID network and tune the network performance through an API.

The servers 104 and storage devices 110 also provide data redundancy. The storage devices 110 comprise RAID controllers which provide data integrity through a built-in redundancy which includes data mirroring. The storage devices 110 are arranged such that, should one of the drives in a group forming a RAID array fail or become corrupted, the missing data can be recreated from the data on the other drives.

The network storage resource 100 comprises a sensor network 200. The sensor network 200 comprises a sensor server 202. The sensor server 202 comprises a storage device 204. However, whilst the sensor server 202 is illustrated, for clarity, as a separate device structure in this embodiment, this need not be so. The sensor server 202 may form part of one or more of the servers 104-1 to 104-N, or a metadata server (MDS) or any additional or alternative structure operable to receive and process sensor data.

The sensor network 200 further comprises a plurality of primary sensor nodes 206-$i$ (where i=1 to N) and a plurality of secondary sensor nodes 208-$i$ (where i=1 to N).

In this embodiment, the primary sensor nodes 206-$i$ are operable to measure a primary parameter of one or more components of the network storage resource 100. A primary parameter is a parameter which provides direct information regarding a property of the component(s) in question.

For example, in an embodiment, the primary sensor nodes 206-$i$ comprise hard drive SMART diagnostic elements as will be described with reference to FIG. 2. When parsed by the sensor server 202, the primary sensor nodes 206-$i$ are operable to obtain SMART data from one or more of the hard drives forming part of the storage resource 110 as will be described later.

The secondary sensor nodes 208-$i$ are operable to measure one or more secondary parameters of one or more components of the network storage resource 100. A secondary parameter is one which provides information regarding a parameter related in some way to the primary parameter in question. The secondary parameter provides direct information regarding a property of the component(s) in question which is related to the primary parameter through a known or determined relationship.

For example, a secondary sensor node 208-*i* may measure the speed of a cooling fan in a storage resource 110. If it is known that there is a relationship between the speed of the cooling fan and the likelihood of errors in the hard drives within the storage resource enclosure, a measured change in speed of the cooling fan could be used as a secondary parameter condition to trigger a measurement of the primary parameter, which may be the acquisition of SMART data from the hard drives within the storage resource 110.

Figure 2:
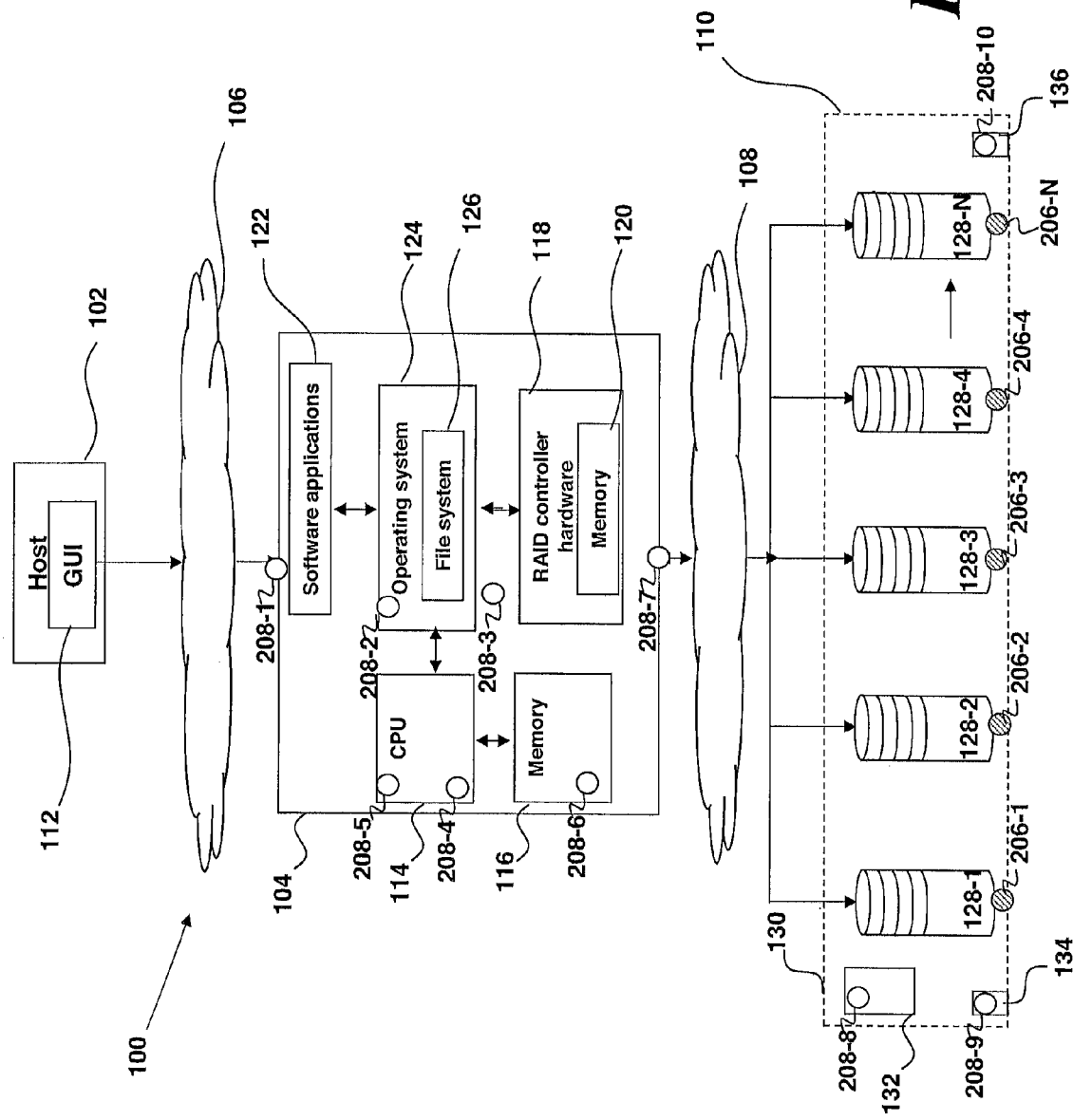
FIG. 2 is a more detailed schematic diagram showing a single server and storage device of an embodiment.

FIG. 2 shows a more detailed schematic diagram of a single host 102 and single server 104 which may form the whole or part of the storage resource 100.

The host 102 comprises a general purpose computer (PC) which is operated by a client and which has access to the storage resource 100. A graphical user interface (GUI) 112 is run on the host 102. The GUI 112 is a software application which acts as a user interface for a client of the host 102.

The server 104 comprises hardware components including a CPU 114 having a local memory 116, and RAID controller hardware 118. The RAID controller hardware 118 comprises a memory 120.

The software components of the server 104 comprise a software application layer 122 and an operating system 124. The software application layer 122 comprises software applications including the algorithms and logic necessary for the initialisation and run-time operation of the server 104. The software application layer 122 includes software functional blocks such as a system manager for fault management, task scheduling and power management. The software application layer 122 also receives commands from the host 102 (e.g., assigning new volumes, read/write commands) and executes those commands. Commands that cannot be processed (because of lack of space available, for example) are returned as error messages to the client of the host 102.

The operating system 124 utilises an industry-standard software platform such as, for example, Linux, upon which the software applications forming part of the software application layer 122 can run. The operating system 124 comprises a file system 126 which enables the RAID controller 104 to store and transfer files and interprets the data stored on the primary and secondary drives into, for example, files and directories for use by the operating system 124.

The RAID controller hardware 118 is the physical processor platform of the RAID controller 104 that executes the software applications in the software application layer 116. The RAID controller hardware 118 comprises a microprocessor, memory 122, and all other electronic devices necessary for RAID control of the storage devices 110. However, the controller hardware need not be in the form of RAID hardware and other storage architectures may be utilised and controlled by the controller and fall within the scope of the present invention.

Whilst, in FIG. 2, the RAID controller hardware 118 is shown as part of the server 104, this need not be so. The skilled person would be readily aware of alternatives which fall within the scope of the present invention; for example, the RAID controller hardware 118 may be remote from the server 104. In addition, the RAID controller hardware 118 may be located together with the storage devices 110 or remotely therefrom.

The server 104, as described above, is specified as a general component of a networked storage resource 100 and may comprise any suitable networked computer system capable of receiving and issuing storage requests (such as I/O requests) and data transfers. However, the server 104 may also be utilised with a computing device having local storage, such as a personal computer or laptop with an internal hard drive or flash memory.

The server 104 is operable to receive storage requests (which may comprise I/O requests) to a file system 126 from hosts or clients 102 and process said storage requests to the file system 126. The file system 126 may comprise any suitable system and may be run on the server 104 to provide access to the storage devices 110. Non-exhaustive examples of suitable file systems may be: NTFS, HFS, ext3, ext4 or idiskfs.

The storage device 110 comprises, in this embodiment, a RAID array of hard drives 128-1-N.

The hard drives 128-1-N may be connected in any suitable RAID array, for example, RAID-5 or RAID-6. Furthermore, whilst, for clarity, only 5 drives are shown in FIG. 2, it is to be understood that other numbers of drives may be used as required, i.e. N may be any suitable number.

The hard drives 128-1-N forming part of the storage device are located within a storage enclosure 130. The storage enclosure 130 may comprise a suitable rack or container to secure the hard drives 128-1-N within. The storage enclosure 130 comprises a cooling device 132 which, in this embodiment, comprises a fan. However, this need not be the case and other arrangements may be utilised as appropriate; for example, liquid cooling systems or a plurality of fans or airflow generators.

Furthermore, the storage enclosure 130 comprises a number of sensors. In this embodiment, a temperature sensor 134 and a vibration sensor 136 are provided.

The sensor network 200 is operable to cover the server 104 and storage resource 110. The sensor network comprises a plurality of primary sensor nodes 206-*i*. In this embodiment, as described above, each hard drive 128-1-N has a corresponding primary sensor node 206-1-N. Each primary sensor node 206-1-N comprises a SMART diagnostic element. This may comprise a hardware or software element, or a combination of both.

The SMART diagnostic element provides a SMART status comprising two values: "threshold not exceeded" and "threshold exceeded". Often these are represented as "drive OK" or "drive fail". A "threshold exceeded" value is intended to indicate that there is a relatively high probability that the drive is likely to fail. The predicted failure may be catastrophic or may relate to a more minor error such as a bad sector or a write fail.

In addition, SMART diagnostics comprise further detail in the form of SMART attributes. This may vary from hard drive to hard drive but may comprise a log containing further information as to the drive status; for example: read/write status; spin up time; start/stop count; seek time performance; seek error rate; command timeout; drive life protection status; or spin retry count.

The above list is intended to be exemplary and is non-exhaustive. Further, formats other than SMART may be used. The primary nodes 206-*i* are merely intended to be operable to report the status of the hard drive 128-*i* in question and the skilled person would readily be aware of variations and alternatives which could be used with the present invention.

The primary nodes 206-*i* are adapted to report the status of one or more hard drives 128-*i* when commanded to do so by the sensor server 202. However, such an instruction and report consumes hardware resources; for example, CPU time, memory capacity, network resources and results in a reduction in read/write access speed on the hard drives 128-*i* concerned. This may be particularly acute if a large number of drives are being commanded to report at the same time and sampled over a particular time period.

For example, SMART data from an enclosure of 84 drives with an average of 40 signals will result to a total of 3360 signals. 5 second internal sampling rate will result to 40320 data points per minute to be transferred, collected and analysed.

In order to reduce the loads on the server 104 and networked storage resource 100, the secondary nodes 208-$i$ can be utilised to obtain measurement data of secondary parameters which, in effect, provide indirect measurement of the primary parameter. In other words, certain detected conditions or combinations of conditions of the secondary nodes 208-$i$ can indicate that a measurement of the primary nodes 206-$i$ is required.

The secondary parameters which can be measured are numerous and are situation- and hardware-dependent. However, in this embodiment, the functioning of a number of non-exhaustive different secondary nodes 208-$i$ will be described.

With reference to FIG. 2, secondary node 208-1 is arranged to monitor the secondary parameter of network traffic to the server 104 through the network 106. Secondary node 208-2 is arranged to monitor the secondary parameter of operating system 124 access behaviour. Secondary node 208-3 is arranged to monitor the secondary parameter of midplane temperature within the server 104.

Secondary nodes 208-4 and 208-5 are arranged to monitor the secondary parameters of CPU usage and CPU temperature. Secondary node 208-6 is arranged to monitor the secondary parameter of memory usage. Finally, secondary node 208-7 is arranged to monitor the network connection and network traffic between the storage resource 110 and the server 104.

Turning now to the storage resource 110, secondary nodes 208-8 and 208-9 are arranged to monitor the fan speed and enclosure temperature respectively. Secondary node 208-10 is arranged to monitor vibration in the enclosure 130.

The above secondary parameters can be used to provide an indication that the primary parameter should be sampled. However, before this can be implemented, it is necessary to obtain experimental and empirical data relating to the relationships between one or more secondary parameter(s) and the primary parameter in question.

The following, non-exhaustive, examples show how the secondary parameters can be utilised to infer properties of the primary parameter without measuring the primary parameter. The following examples are based on a range of interrelationships and techniques. For example, a direct mathematical relationship between two parameters could be established such as the effect of hard drive temperature on the lifetime of a hard drive. Other relationships could be based upon statistical inference using techniques such as Bayesian probability.

Bayesian probability involves the use of hierarchical models and marginalisation over the values of secondary parameters to infer values of the primary parameter(s). In many cases, the determination of such computational relationships is intractable. However, good approximations can be obtained using, for example, Markov chain Monte Carlo methods or by experimental or empirical verification.

EXAMPLE 1

Thermal Characteristics

Figure 3:
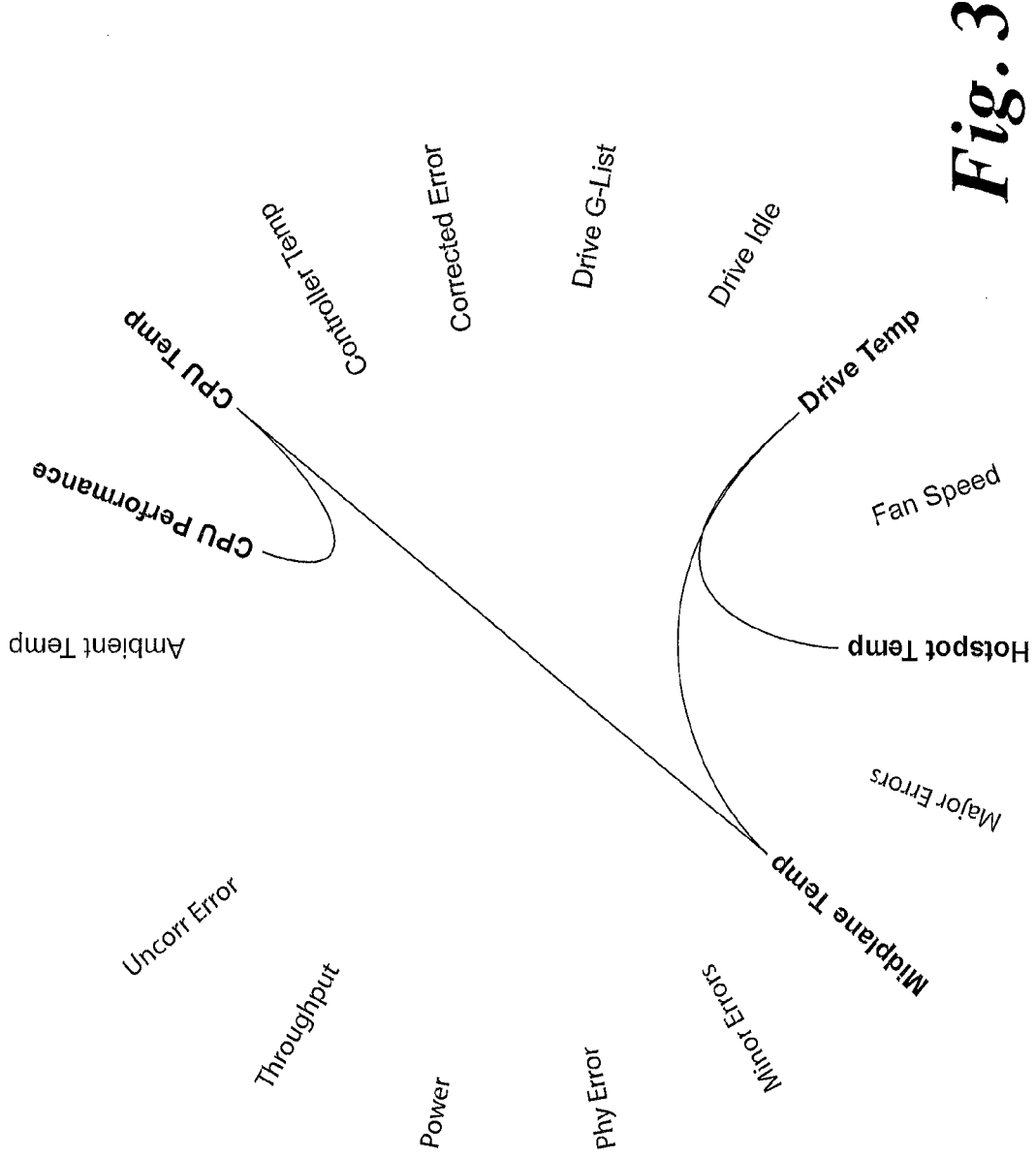
FIG. 3 is a dependency map showing a first example of dependency relationships according to the present invention.

FIG. 3 illustrates a dependency map using the temperature sensor 134 as the secondary node 208-9 of interest. The dependency map of FIG. 3 shows the pre-determined empirical relationship between the secondary parameters of average temperature of a hard drive 128-$i$ row in the enclosure 130, the midplane temperature as measured by secondary node 208-3, and the CPU temperature and load as measured by secondary nodes 206-4 and 206-5.

If, by measuring the above secondary parameters, deviation from the expected model occurs, then the primary parameter should be obtained, or obtained more frequently since there is a greater likelihood of there being a hard drive problem based on the detected secondary parameters and the relationship between the primary parameter (i.e. hard drive status) and the secondary parameters.

EXAMPLE 2

Vibration Characteristics

Figure 4:
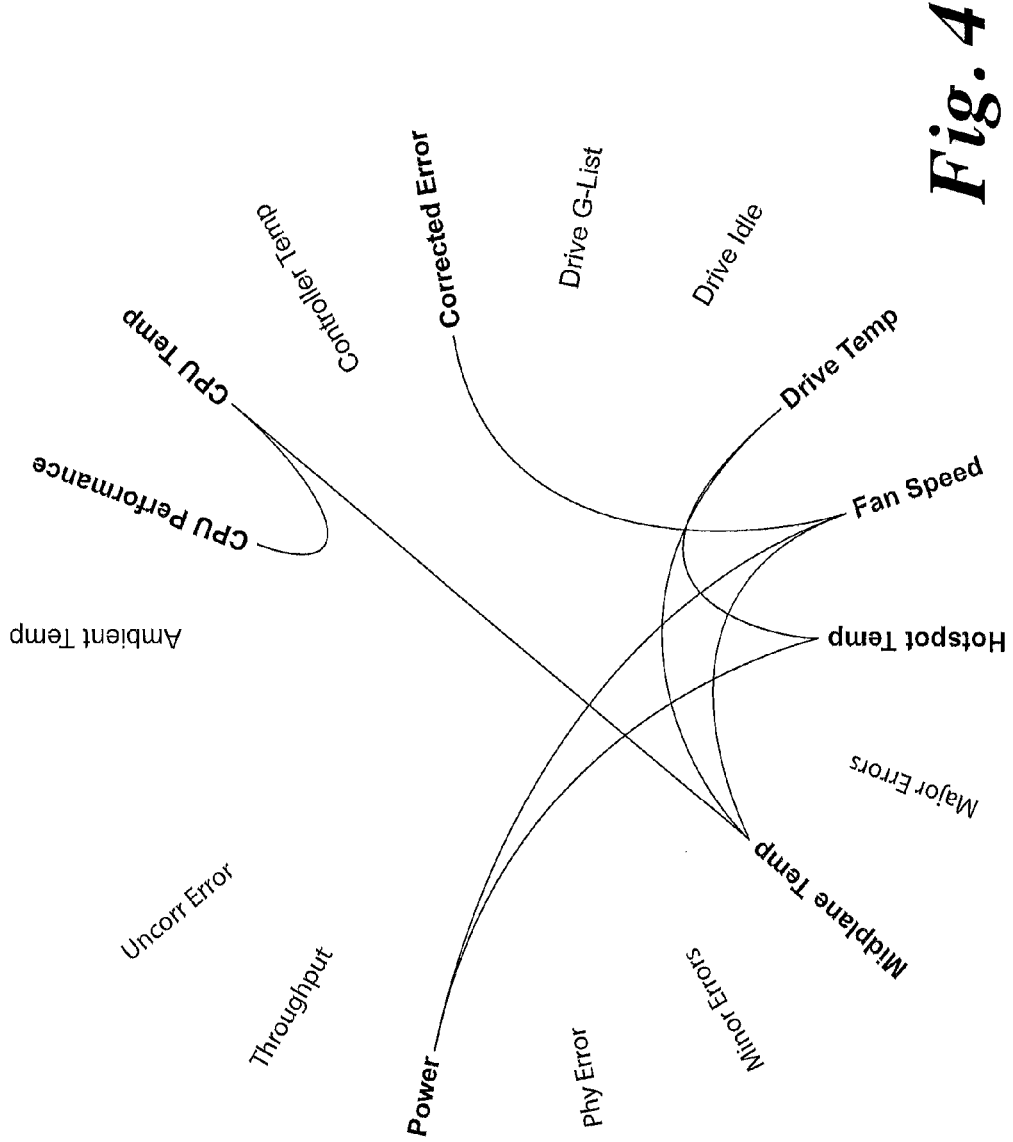
FIG. 4 is a dependency map showing a second example of dependency relationships according to the present invention.

FIG. 4 shows a further dependency map which includes additional parameters relating the fan speed and performance.

The cooling fan 132 causes vibration in the enclosure 130. Vibration of the enclosure (and correspondingly, the enclosed hard drives 128-N) has a correlation with the emergence of hard drive errors.

Operational modes of the fan (e.g. fan speed ranges) can result in critical operating modes in the system, e.g. resonance conditions which cause excessive vibration. Concomitantly, lower fan speeds can result in excessive heating which can also lead to hard drive failure. These critical modes of operation may affect the enclosure 130 and the performance of the hard drives 128, CPU 114 and memory 116.

In addition to the example outlined above, possible hard drive failure (e.g. head failures) can be identified by deviation from expected characteristics of these interrelated secondary parameters. In this case, the primary parameter should be obtained, or obtained more frequently since there is a greater likelihood of there being a hard drive problem based on the detected secondary parameters and the relationship between the primary parameter (i.e. hard drive status) and the secondary parameters.

Further, the arrangements above enable optimisation of the components of the network storage resource 100 where knowledge of the interconnections between parameters is obtained and utilised.

EXAMPLE 3

Power Characteristics

Figure 5:
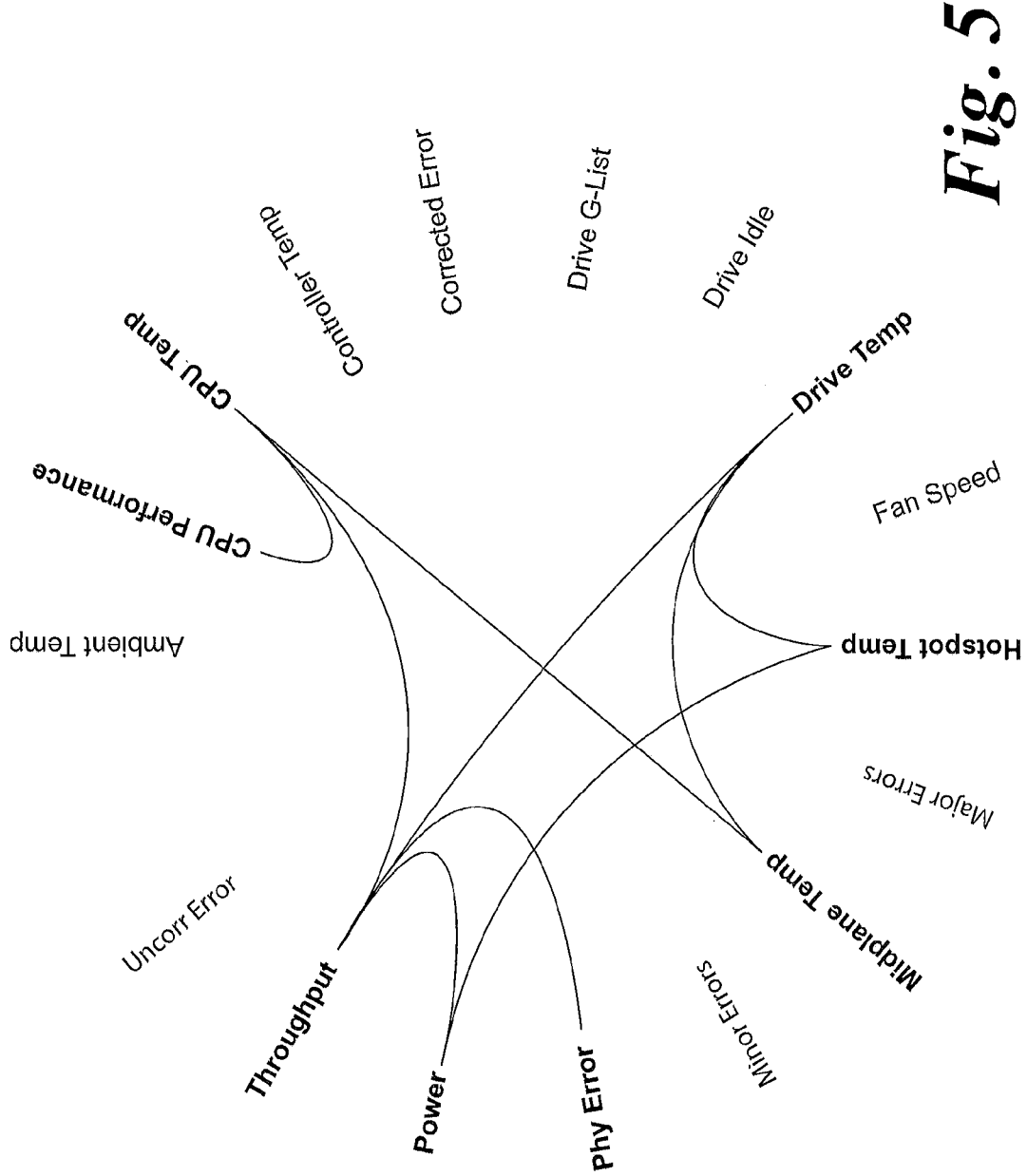
FIG. 5 is a dependency map showing a third example of dependency relationships according to the present invention.

FIG. 5 shows a further dependency map which includes secondary parameters relating to network performance, power supply, CPU usage and fan characteristics.

In a situation where the I/O patterns, CPU usage and fan operational modes are known, the power trends of the server 104 and enclosure 130 may follow a specific pattern. This can be determined by forming a power model based on a thermal model, application loads and network loads on the server 104. Deviations from the power model potentially demonstrate a hard drive issue.

Therefore, by measuring the above secondary parameters, deviation from the expected model can be detected. In response, the primary parameter can be obtained, or obtained more frequently since there is a greater likelihood of there being a hard drive problem based on the detected secondary parameters and the relationship between the primary parameter (i.e. hard drive status) and the secondary parameters.

The following further examples illustrate additional parameters and relationships that could be used.

EXAMPLE 4

Utilisation

The utilisation factor of the hard drives 128, CPU 114 and network 106 (via appropriate secondary sensor nodes 208-$i$) could be used to determine the sampling rate for the primary parameter (drive status).

For example, it is known that the utilisation factor has a correlation with drive failure. Therefore, in response, the primary parameter can be obtained, or obtained more frequently since there is a greater likelihood of there being a hard drive problem based on the detected secondary parameters and the relationship between the primary parameter (i.e. hard drive status) and the secondary parameters.

EXAMPLE 5

Network Bandwidth

There is a network bandwidth limit which enforces how much data can be used. This enforces a top limit on amount of data that can be requested. If this data limit is reached or varies from a predetermined model, it may have an adverse effect on the performance of the drives. This may be detected through secondary parameters.

EXAMPLE 6

Hard Drive Lifetime

Specific drive types have an expected life time. By having this information and cross-correlating with rate of error on the hard drives 128, critical modes can be detected. Therefore, in response, the primary parameter can be obtained, or obtained more frequently, on those particular hard drives 128 since there is a greater likelihood of there being a hard drive problem based on the detected secondary parameters and the relationship between the primary parameter (i.e. hard drive status) and the secondary parameters.

EXAMPLE 7

Additional Sensory Information

If the server 104 and enclosure 130 are to be used in an application such as on-board ship, other sensory information from the platform can be used to detect critical operational modes. The sensory information can include but are not limited to temperature, humidity, altitude, shock, vibration, airborne particles which can affect the performance and life time of the components. Once a model is established for these parameters, they can be used as secondary parameters to detect drive status.

EXAMPLE 8

Noise and Vibration

In an application with high audible noise (e.g. factory), performance of the hard drives 128 can be affected. The vibration sensor 136 can be used as a secondary sensor node 208-10, or a microphone could be used as an alternative or additional secondary node 206.

EXAMPLE 9

Network Bandwidth as a Function of Controller Version

Information about the model of the server 104, hard drives 128 and enclosure 130 could be used in conjunction with network bandwidth to define a particular sampling rate for the primary parameter.

EXAMPLE 10

Customer Usage

Customer usage of a network storage resource 100 could be used to determine the sampling rate of the primary parameter. Thus, the monitoring of the primary parameter could be increased when the usage of the networked storage resource 100 is low, reducing the impact on system performance. Alternatively, it may be determined that the higher the customer usage, the greater the likelihood of errors occurring, and so checking of the primary parameter could be scheduled more frequently.

This variability can be contrasted with known utilities which conventionally pull data at the same rate irrespective of usage. This may result in system halt if many components are monitored at the same time.

EXAMPLE 11

Component Versions

Component versions, model and lifetime expectancy information could be used as secondary parameters to determine the sampling rate, or range of sampling rates, available for sampling the primary parameter.

EXAMPLE 12

I/O Rate

In general, the I/O rate of the hard drives 128 will be approximately constant for a given load on the storage resource 110. Therefore, an abrupt step change in the average I/O rate of the hard drives 128 (e.g. read/write speed and pattern) potentially identifies a change in performance. For example, this may indicate a slower hard drive in the system, or an intermittent failure. The primary parameter could then be sampled more frequently in response to this indication.

The above examples illustrate how the relationships between different secondary parameters could be used to infer information regarding the primary parameter and, thus, be used to control the sampling rate of the primary parameter. However, the above examples are non-exhaustive and other relationships between the disclosed secondary parameters, and other secondary parameters, may be used with the present invention to control the sampling rate of the primary parameter.

In addition, whilst the primary parameter has been described and illustrated with respect to drive status (in, the disclosed embodiments, utilising the SMART protocol), alternative or additional primary parameters could be used. In general, it is desirable for the primary parameter to be one that measurement thereof is required to be minimised to improve performance of the system. However, this need not be so.

FIGS. 6 and 7 show a flow chart illustrating the steps of the method according to an embodiment of the present invention.

FIG. 6 shows a training method for obtaining relationships between the primary parameter and the secondary parameter(s). FIG. 7 shows a method of utilising the database in a networked storage resource such as that shown in FIG. 1 or 2.

With reference to FIG. 6, the database of relationships is first obtained.

Step 300: Initialise Database

At step 300, the database of relationships between primary and secondary parameters is initialised. This is done by identifying the primary and secondary nodes 206-*i*; 208-*i* from which data is to be obtained. The method proceeds to step 302.

Step 302: Collect Data

At step 302, a computer program is arranged to monitor the operation of a given network storage resource or server, and to obtain data relating to multiple parameters as discussed above in the context of the embodiments of FIGS. 1 and 2. The data collection program interacts with the relevant sensor nodes and system components to capture the sensory and status data to enable determination of dynamic relationships between the primary and secondary parameters.

The method then proceeds to step 304.

Step 304: Analyse Data

At step 304, the computer program uses appropriate algorithms, computation, or inputted empirical relationships to determine relationships between parameters for a given system. The analytics package is arranged to interpret the complex correlations in the system. After the models are built through the analytics package, primary parameters can be adjusted in use if deviations on other correlated secondary signals are observed.

Step 306: Implement Relationships

The information derived in step 304 can then be stored in a look-up table or similar arrangement and used to control the sampling rate of the primary parameter in use.

The method of FIG. 6 discussed above may operate in conjunction with the method of FIG. 7 or may be separate. For example, the training method of FIG. 6 may establish a standalone database of relationships which are implemented in hardware or software and utilised unamended on a given network storage resource. In this case, the prepared database will be general to similar storage systems and not individual to a specific storage system.

Alternatively, the method of FIG. 6 may be run, for the first time, when implemented on a given piece of hardware such as a specific network storage resource. Thus, the algorithms and optimization will prepare a database of relationships specific to that individual system.

In a further alternative, a hybrid of the above cases could be implemented whereby a basic core of relationships could be modified to relate to specific individual requirements of a particular system.

Once the database of relationships has been established, this can be used to control the sampling rate of the primary parameter as discussed below in relation to FIG. 7.

Step 400: Initialise

At step 400, the database of relationships between primary and secondary parameters is initialized and the primary and secondary nodes 206-*i*; 208-*i* from which data is to be obtained are initiated with initial sampling rates. The sampling rates used may vary and may be zero (if the node is not required at runtime).

The method proceeds to step 402.

Step 402: Run

The arrangement as set up above is run and data is collected on the primary and secondary nodes 206, 208 as set up above. In general, the sample rate for the primary nodes is set as low as possible (possibly at zero) and controlled in subsequent steps in response to data collected from the secondary nodes 208.

The method proceeds to step 404.

Step 404: Collect Secondary Parameter Data

The secondary parameter data is collected from the secondary sensor nodes 208 as initialized in the steps above. These nodes may include any, or additional secondary sensor nodes 208 as set out in the examples of FIGS. 1 and 2. The sampling rate set for these secondary nodes 208 is set during initialisation but may be varied. In general, secondary node data will be less resource-intensive than primary node data and so the sampling rate can be correspondingly higher. Data collection on a hardware level is carried out through a script. The required sampling rate is sent through a command line and as an argument.

As more secondary parameter data is obtained, the system is also operable to determine the optimal sample rate for the secondary parameters based on the criticality of each parameter for monitoring the operational state of the system or the primary parameter. In other words, the sample rates for the secondary parameter data are obtained based upon the importance of the relationships between those specific secondary parameters and the primary parameter.

The method proceeds to step 406.

Step 406: Analyse Secondary Parameter Data

The data collected in step 406 is then analysed based on the pre-determined algorithms and relationships as set out above. The method then proceeds to step 408.

Step 408: Adjust Primary Parameter Sample Rate?

At step 408, it is determined whether the analysis performed in step 406 on the data obtained in step 404 is in accordance with nominal hard drive operation or whether the obtained relationships indicate that there may be a hard drive issue.

If it is determined that there is no, or little, likelihood of a hard drive problem, the sampling rate of the primary parameter may be reduced or the sampling stopped altogether. Alternatively, if it is determined that a problem, or a potential anomaly, may have arisen, the primary node sampling rate may need to be increased. In either of these cases, the secondary parameters have provided indication that the primary sampling rate is required to be adjusted. The method then proceeds to step 410.

Alternatively, if it is determined that the sampling rate of the primary parameter is at the level required based on the indications from the obtained secondary parameters, the method proceeds back to step 404 and the steps are repeated.

Step 410: Adjust Primary Parameter Sampling Rate

At step 410, it is determined that, based upon the correlated secondary parameter data obtained in the steps above, that the primary sampling rate of the primary parameter (which is, in one described embodiment, the hard drive status) should be adjusted. The sampling rate can be increased or decreased in dependence upon the nature of the secondary data and the relationships as set out above. The required sampling rate is sent through a command line and as an argument.

Once the sampling rate has been adjusted, the method proceeds to step 412 if the primary sampling rate is greater than zero. If the primary sampling rate is zero (i.e. primary node sampling is disabled) the method proceeds directly back to step 404.

Step 412: Collect Primary Parameter Data

Primary parameter data is collected if enabled. This data can be used to perform analytics on the hard drives 128 to determine if there is a drive error, or an imminent failure. This data can be stored in a log on, for example, the storage resource 204 of the sensor server 202. Data collection on a hardware level is carried out through a script.

The method then proceeds back to step 404 and the steps are repeated.

Variations of the above embodiments will be apparent to the skilled person. The precise configuration of hardware and software components may differ and still fall within the scope of the present invention.

Whilst the above embodiments have been described with reference to networked systems, resources and servers, other implementations could be used. The present invention is applicable to any arrangement where large amount of data is to be stored or analysed. Some examples of other applications may be: manufacturing technology; factory automation; aerospace; or indexing in data storage.

Further, whilst the above embodiment has been illustrated with regard to a single primary parameter of drive status, this need not be so. Any suitable primary parameter could be implemented as required. In addition, multiple primary parameters may be controlled by one or more secondary parameters.

Additionally, the secondary sampling rate could be varied in dependence upon the criticality of various secondary parameters to the current operational state of the system or to the primary parameter.

Further, the present invention has been described with reference to controllers in hardware. However, the controllers and/or the invention may be implemented in software.

Additionally, whilst the present embodiment relates to arrangements operating predominantly in off-host firmware or software, an on-host arrangement could be used.

The controller or method of the present embodiments may be used to manage a plurality of separate networked storage resources if required.

In addition, whilst a RAID array has been described in embodiments as a storage architecture for use with the present invention, this need not necessarily be the case. Any suitable storage or hard disk protocol may be used with the present invention.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method, comprising:
  measuring a secondary parameter of an enclosure that houses a drive array comprising a plurality of storage devices, the secondary parameter indicating a condition that affects the plurality of storage devices;
  determining, based upon the condition indicated by the secondary parameter, a sample rate for SMART diagnostic data provided from the plurality of storage devices; and
  obtaining the SMART diagnostic data from the plurality of storage devices at the sample rate in response to the condition.

2. A method according to claim 1, wherein the secondary parameter is selected from the group of: storage device temperature, enclosure temperature, enclosure fan speed, CPU temperature, CPU loading, memory usage, network usage, localised vibration, and midplane temperature.

3. A method according to claim 1, further comprising, prior to the obtaining of the secondary parameter data:
  obtaining data relating to the secondary parameter and a primary parameter of the SMART diagnostic data;
  analysing the primary and secondary parameters to determine correlations therebetween; and
  constructing a database containing pre-determined relational parameters between the primary and secondary parameters.

4. A method according claim 3, further comprising using a Bayesian probability analysis to determine the correlations.

5. The method according to claim 1, wherein the obtaining of the secondary parameter data has less impact on performance of the computing system than the obtaining of the SMART diagnostic data.

6. A method according to claim 1, further comprising determining relationships between the secondary parameter and another secondary parameter of the enclosure to infer information regarding the primary parameter, the information used to control the determined sampling rate.

7. The method according to claim 1, wherein determining the sample rate comprises increasing the sample rate from a previous value.

8. The method according to claim 1, wherein determining the sample rate comprises decreasing the sample rate or stopping the sampling of the SMART diagnostic data.

9. A disk array comprising:
  an enclosure;
  a plurality of data storage device within the enclosure each providing SMART diagnostic data
  a sensor configured to measure a secondary parameter indicating a condition of the enclosure that affects the plurality of storage devices; and
  a controller coupled to the plurality of storage devices and the sensor and configured to:
    determine, based upon the condition indicated by the secondary parameter, a sample rate for the SMART diagnostic data; and
    obtain the SMART diagnostic data at the sample rate in response to the condition.

10. A disk array according to claim 9, wherein the computing system comprises a midplane including a CPU and memory, one or more storage devices located within an enclosure and at least one network connection.

11. A disk array according to claim 10, wherein one or more of the secondary parameters is selected from the group of: storage device temperature, enclosure temperature, enclosure fan speed, CPU temperature, CPU loading, memory usage, network usage localised vibration, and midplane temperature.

12. A disk array according to claim 9, further operable to:
  obtain data relating to the secondary parameter and a primary parameter of the SMART diagnostic data;
  analyse the primary and the secondary parameters to determine correlations therebetween; and
  construct a database containing pre-determined relational parameters between the primary and the secondary parameters.

13. A disk array according to claim 12, wherein the analysis includes using a Bayesian probability analysis to determine the correlations.

14. A drive array according to claim 9, wherein the obtaining of the secondary parameter data has less impact on performance of the computing system than the obtaining of the SMART diagnostic data.

15. The disk array according to claim 9, wherein determining the sample rate comprises increasing the sample rate.

16. The disk array according to claim 9, wherein determining the sample rate comprises decreasing the sample rate or stopping the sampling of the SMART diagnostic data.

17. A non-transitory computer usable storage medium having a computer program product stored thereon comprising one or more software portions for performing the steps of claim 1.

18. A method, comprising:
obtaining secondary parameter data from a sensor that measures a condition affecting a plurality of storage devices in a drive array enclosure;
determining, based upon one or more relationships between the secondary parameter data and a primary parameter, a secondary sample rate for the secondary parameter data;
obtaining the secondary parameter data at the secondary sample rate;
utilising the secondary parameter to infer indirectly properties of the primary parameter;
determining, based upon the relationships between the secondary parameter data and the primary parameter, a primary sample rate for SMART diagnostic data provided from the plurality of storage devices, the primary parameter determined from the SMART diagnostic data; and
obtaining the SMART diagnostic data at the primary sample rate from the plurality of storage devices in response to the condition.

19. A method according to claim 18, wherein one or more of the secondary parameters is selected from the group of: storage device temperature, enclosure temperature, enclosure fan speed, CPU temperature, CPU loading, memory usage, network usage, localised vibration, and midplane temperature.

20. A method according to claim 18, further comprising, prior to the obtaining of the secondary parameter data:
obtaining data relating to the primary parameter and the secondary parameter data; and
analysing the primary and the secondary parameters to determine correlations therebetween; and
constructing a database containing pre-determined relational parameters between the primary and the secondary parameters.

21. A method according claim 20, further comprising using a Bayesian probability analysis to determine the correlations.

22. The method according to claim 18, wherein determining the primary sample rate comprises increasing the primary sample rate.

23. The method according to claim 18, wherein determining the primary sample rate comprises decreasing the primary sample rate or stopping the sampling of the SMART diagnostic data.

* * * * *